(12) United States Patent
Kato et al.

(10) Patent No.: US 7,117,681 B2
(45) Date of Patent: Oct. 10, 2006

(54) THRUST CONTROL VALVE

(75) Inventors: Hiroshi Kato, Kakamigahara (JP);
Tatsuo Takahashi, Kakamigahara (JP);
Hideaki Tanaka, Kakamigahara (JP);
Tatsuya Nishikawa, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 1 day.

(21) Appl. No.: 10/774,610

(22) Filed: Feb. 10, 2004

(65) Prior Publication Data

US 2004/0195363 A1 Oct. 7, 2004

(30) Foreign Application Priority Data

Feb. 19, 2003 (JP) ............... 2003-041730

(51) Int. Cl.
*F02K 1/00* (2006.01)

(52) U.S. Cl. ............... 60/771; 60/770; 239/265.19

(58) Field of Classification Search ............... 60/771, 60/242, 770; 239/265.19; 251/120, 121
See application file for complete search history.

(56) References Cited

U.S. PATENT DOCUMENTS

| | | | | |
|---|---|---|---|---|
| 2,590,318 A | * | 3/1952 | Hollis ............... | 251/121 |
| 2,776,673 A | * | 1/1957 | Goodman et al. ......... | 137/493 |
| 3,192,714 A | * | 7/1965 | Hickerson ............... | 60/230 |
| 3,503,585 A | * | 3/1970 | Vogeli ............... | 251/121 |
| 3,712,063 A | * | 1/1973 | Andrysiak et al. ............ | 60/265 |
| 3,948,042 A | * | 4/1976 | Beardsley et al. ............ | 60/242 |
| 3,970,252 A | * | 7/1976 | Smale et al. ............ | 239/127.3 |
| 4,826,104 A | | 5/1989 | Bennett et al. | |
| 6,170,257 B1 | | 1/2001 | Harada et al. | |

FOREIGN PATENT DOCUMENTS

| | | |
|---|---|---|
| EP | 0 489 712 A2 | 6/1992 |
| EP | 1 243 783 A1 | 9/2002 |
| JP | A 11-83396 | 3/1999 |
| JP | 2000-283301 A | 10/2000 |
| JP | A 2000-283301 | 10/2000 |
| JP | 2001-123887 A | 5/2001 |

\* cited by examiner

*Primary Examiner*—William H. Rodriguez
(74) *Attorney, Agent, or Firm*—Oliff & Berridge, PLC

(57) ABSTRACT

A thrust control valve includes a nozzle having a gas supply chamber, a gas jetting chamber and a connecting passage therebetween. The nozzle has an upstream inner surface defining the gas supply chamber and a downstream inner surface defining the gas jetting chamber. The valve also includes a plug axially movably inserted into the gas supply chamber, the connecting passage and the gas jetting chamber. The plug has an upstream outer surface facing the upstream inner surface to define an upstream passage and a downstream outer surface facing the downstream inner surface to define a downstream passage. The plug can control thrust by simultaneously changing sectional areas of the upstream and downstream passages by an axial movement of the plug.

4 Claims, 8 Drawing Sheets

GAS GENERATING CAPACITY : 100%

GAS GENERATING CAPACITY : 100%

THRUST CONTROL VALVE OF
THE PRESENT EMBODIMENT
(MAXIMUM TURNING)

DIFFERENTIAL THRUST
CONTROL VALVE
(MAXIMUM TURNING)

THRUST CONTROL VALVE

BACKGROUND OF THE INVENTION

1. Technical Field

The present invention relates to a constitution of a thrust control valve for controlling the thrust (propulsion) of a secondary propulsion engine, such as a thruster for controlling the orbit and attitude of a flying object, and the speed of the flying object.

2. Description of the Related Art

The attitude of a flying object that flies at high altitudes in the atmosphere cannot satisfactorily be controlled and the orbital control (diversion) of the same cannot satisfactorily achieved only by a control effort generated by a control wing. Therefore, the flying object is provided with a thruster that jets a high-pressure propulsion gas supplied from a chamber containing a propellant. The thruster is provided with a thrust control valve called a propellant valve for controlling the thrust generated by jetting the propulsion gas.

FIGS. 6A and 6B are typical views of a conventional pintle thrust control valve 1 in an open state and in a closed state, respectively. The pintle thrust control valve 1 has nozzle 5 and a plug 9. The nozzle 5 has a gas supply chamber 2 to which a propulsion gas is supplied, a gas jetting chamber 3 the propulsion gas is jetted, and a connecting passage 4 defined by a surface 6 and coaxially connecting the gas supply chamber 2 and the gas jetting chamber 3. The plug 9 is placed for axial movement in the gas supply chamber 2 coaxially with the gas supply chamber 2, the gas jetting chamber 3 and the connecting passage 4. The plug 9 has a taper tip having a taper surface 7. A passage 8 is defined by the surface 6 and the taper surface 7.

The plug 9 is moved axially by a drive system including a motor. The sectional area of the passage 8 is varied according to the position of the plug 9 to control thrust generated by jetting the propulsion gas. The product of the pressure P1 of the propulsion gas in the gas supply chamber 2, and the pressure-receiving area A of the taper surface 7 of the plug 9 is equal to a load F that urges the plug 9 axially away from the surface 6. The load F increases as the required thrust increases, and hence the drive system including the motor for driving the plug 9 is large (EP-A No. 489712).

FIG. 7 is a typical sectional view of another conventional differential thrust control valve 11. The differential thrust control valve 11 has a nozzle 15 and a pair of plugs 19a and 19b. The nozzle 15 has a pair of gas supply chambers 12a and 12b to which a propulsion gas is supplied, a pair of gas jetting chambers 13a and 13b through which the propulsion gas is jetted, and a pair of connecting passages 14a and 14b respectively defined by surfaces 16a and 16b and coaxially connecting the gas supply chambers 12a and 12b, and the gas jetting chamber 13a and 13b, respectively. The plugs 19a and 19b are placed for axial movement in the gas supply chambers 12a and 12b coaxially with the gas supply chambers 12a and 12b, the gas jetting chambers 13a and 13b and the connecting passages 14a and 14b, respectively. The plugs 19a and 19b have taper tips respectively having taper surfaces 17a and 17b. Passages 18a and 18b are defined by the surfaces 16a and 16b and the taper surfaces 17a and 17b, respectively.

The pair of plug 19a and 19b of the differential thrust control valve 11 are moved axially by a motor to change thrusts linearly. Since loads that act on the plugs 19a and 19b cancel each other, the torque to be produced by the motor is smaller than that to be produced by the motor of the conventional pintle thrust control valve 1 shown in FIGS. 6A and 6B. However, opposite thrusts are generated even in a state where any thrust is not necessary and hence the flow rate of the necessary propulsion gas increases (JP11-83396A).

FIGS. 8A and 8B are typical sectional views of a conventional floating-poppet thrust control valve 21 in an open state and in a closed state, respectively. This floating-poppet thrust control valve 21 has a nozzle 25 provided with a gas supply chamber 22 in which a propulsion gas is supplied, a gas jetting chamber 23 through which the propulsion gas is jetted, and a connecting passage 24 defined by a surface 26 and coaxially connecting the gas supply chamber 22 and the gas jetting chamber 23. This thrust control valve 21 also has a plug 29 axially movable in the gas supply chamber 22, the connecting passage 2 and the gas jetting chamber 23 to open and close the connecting passage 24, a poppet 30 fixedly connected to the plug 29 and provided with through holes 33, and a solenoid valve 31 for controlling pressure in a back space 32 behind the poppet 30.

In this thrust control valve 21, the gas supply chamber 22 communicates with the back space 32 by means of the through holes 33 of the poppet 30. The axial position of the plug 29 is changed by adjusting the pressure in the back space by adjusting the opening of the solenoid valve 31.

This floating-poppet thrust control valve 21 is unable to control the generated thrust linearly and hence the solenoid valve 31 is controlled by a pulse width modulation (PWM) drive system. Therefore, a control signal for controlling the solenoid valve 31 acts as noise on a guide signal for guiding the flying object. Thus, it is possible that the control signal reduces the accuracy of guiding the flying object (JP2000-283301A).

SUMMARY OF THE INVENTION

Accordingly, it is an object of the present invention to provide a thrust control valve having a plug which is capable of reducing load loaded by a propulsion gas on the plug, of reducing the flow rate of the propulsion gas to reduce the consumption of the propulsion gas, and of suppressing the generation of noise that deteriorates the guiding accuracy of a flying object.

A thrust control valve according to the present invention includes: a nozzle provided with a gas supply chamber in which a propulsion gas is supplied, a gas jetting chamber through which the propulsion gas is jetted, and a connecting passage coaxially connecting the gas supply chamber and the gas jetting chamber, the nozzle having an upstream inner surface defining the gas supply chamber and a downstream inner surface defining the gas jetting chamber; and a plug inserted into the gas supply chamber, the connecting passage and the gas jetting chamber so as to be axially movable, the plug having an upstream outer surface facing the upstream inner surface to define an upstream passage on a side of the gas supply chamber together with the upstream inner surface, and a downstream outer surface facing the downstream inner surface to define a downstream passage on a side of the gas jetting chamber together with the downstream inner surface, the plug being configured to be capable of controlling a thrust to be produced by jetting the propulsion gas by simultaneously changing sectional areas of the upstream passage and the downstream passage by an axial movement of the plug.

According to the present invention, the respective sectional areas of the upstream passage and the downstream passage can be changed by axially moving the plug, and thereby the flow rate of the propulsion gas flowing through the gas supply chamber, the connecting passage and the gas jetting chamber is changed according to the sectional areas of the upstream passage and the downstream passage to control thrust.

A first force produced by the pressure of the propulsion gas in the gas supply chamber applied to the upstream outer surface of the plug acts in a direction from the side of the gas jetting chamber toward the side of the gas supply chamber, and a second force produced by the pressure of the propulsion gas in the gas jetting chamber applied to the downstream outer surface of the plug acts in a direction from the side of the gas supply chamber toward the side of the gas jetting chamber. Thus, the first force and the second force act in opposite directions, respectively, and cancel each other. Consequently, the difference between the first force and the second force acts as an effective force on the plug. The thrust control valve simple in construction is capable of reducing the unnecessary use of the propulsion gas to the least possible extent by stopping jetting the propulsion gas when any thrust does not need to be produced, does not generate noise that deteriorates the accuracy of flying object guidance, reduces load applied by the propulsion gas on the plug, and controls thrust in an improved response characteristic.

Preferably, the plug has an upstream pressure-receiving part on the side of the gas supply chamber and a downstream pressure-receiving part on the side of the gas jetting chamber, the upstream pressure-receiving part being configured to be capable of moving in the gas supply chamber and the connecting passage and having an upstream pressure-receiving surface on which a pressure of the propulsion gas acts to produce a force that acts in a direction from the side of the gas jetting chamber toward the side of the gas supply chamber, and the downstream pressure-receiving part being configured to be capable of moving in the gas jetting chamber and the connecting passage and having a downstream pressure-receiving surface on which a pressure of the propulsion gas acts to produce a force that acts in a direction from the side of the gas supply chamber toward the side of the gas jetting chamber.

According to the present invention, since the plug has the upstream pressure-receiving part on the side of the gas supply chamber and the downstream pressure-receiving part on the side of the gas jetting chamber, changes of the acting force according to the moving amount and the moving direction of the plug can be adjusted by the sizes and shapes of the pressure-receiving surfaces of the upstream and downstream pressure-receiving parts. Thus, thrust control response characteristic can easily be optimized so that a desired thrust can be produced in various jetting modes including a continuous jetting mode and a pulsed jetting mode.

Preferably, the downstream pressure-receiving surface has an inclined surface which is inclined so as to separate from an axis of the plug along an axial direction away from the upstream pressure-receiving part.

Preferably, the downstream pressure-receiving surface has a first inclined surface which is inclined so as to approach the downstream inner surface along an axial direction away from the upstream pressure-receiving part and a second inclined surface which is inclined so as to separate from the downstream inner surface along the axial direction away from the upstream pressure-receiving part.

According to the present invention, the thrust control response characteristic of the thrust control valve can easily and highly accurately be optimized by individually adjusting the respective axial lengths, radial lengths and shapes of the first and the second inclined surface of the downstream pressure-receiving surface so that a desired thrust can be produced in various jetting modes including a continuous jetting mode and a pulsed jetting mode.

Preferably, the upstream pressure-receiving surface of the plug is inclined so as to separate from an axis of the plug along an axial direction away from the side of the gas jetting chamber.

Preferably, the upstream pressure-receiving part of the plug and the downstream pressure-receiving part of the plug are connected via a straight connecting part.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
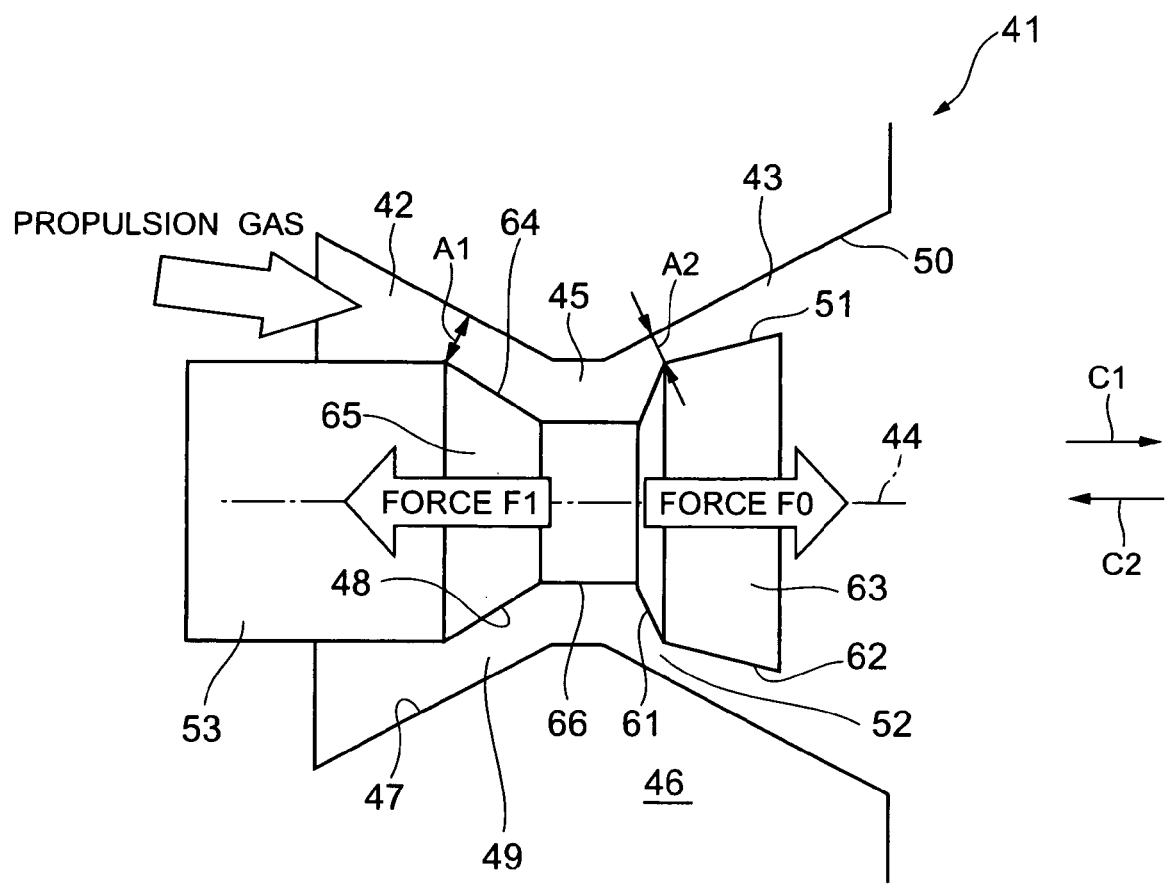
FIG. 1 is a schematic, fragmentary, longitudinal sectional view of a thrust control valve in a preferred embodiment according to the present invention.
Figure 2A:
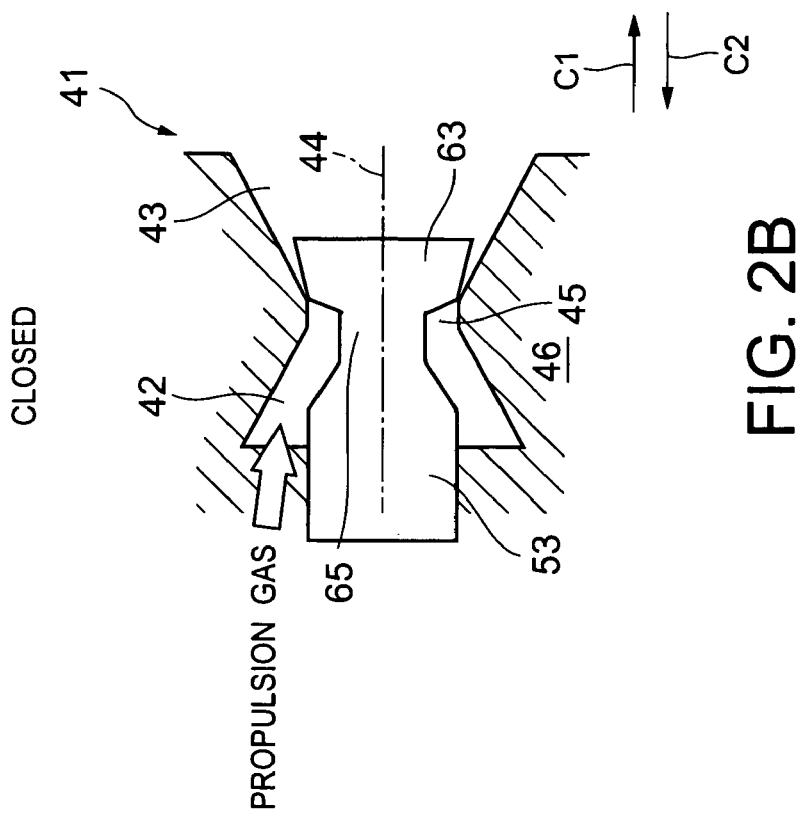
FIG. 2A is a schematic, fragmentary, longitudinal sectional view of the thrust control valve shown in FIG. 1 in a fully open state.
Figure 2B:
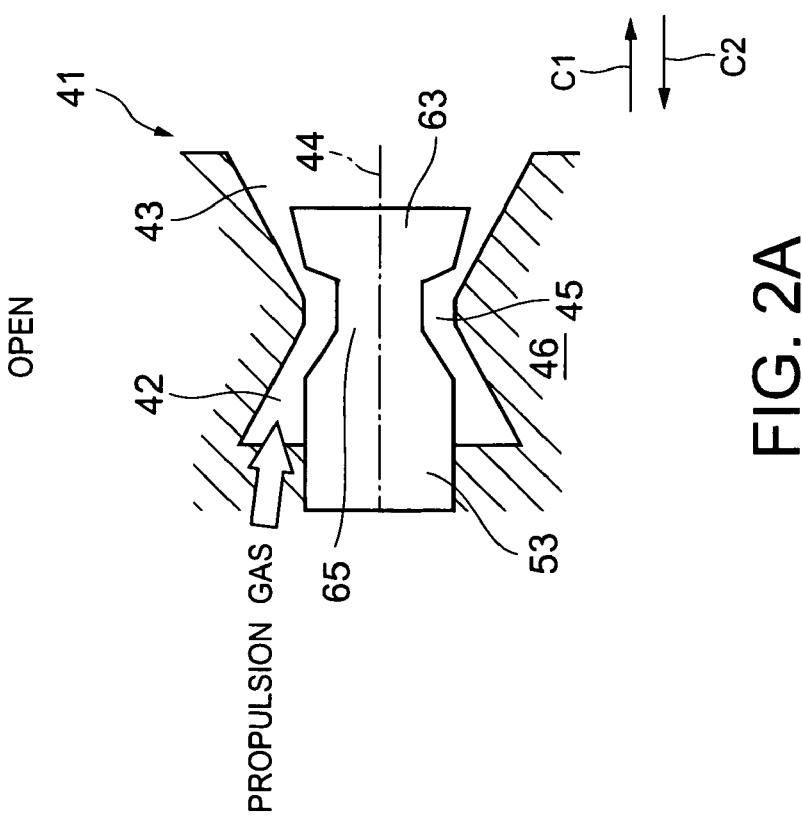
FIG. 2B is a schematic, fragmentary, longitudinal sectional view of the thrust control valve shown in FIG. 1 in a fully closed state.

The thrust control valve 41 in a preferred embodiment according to the present invention is mounted on a flying object to control the thrust (propulsion) of a secondary propulsion engine, such as a thruster for the control of the orbit and attitude of the flying object, and the speed of the flying object.

The thrust control valve 41 includes a nozzle 46 provided with a gas supply chamber 42 in which a propulsion gas is supplied, a gas jetting chamber 43 through which the propulsion gas is jetted, and a connecting passage 45 coaxial with the gas supply chamber 42 and the gas jetting chamber 43 and having an axis 44 in common with the gas supply chamber 42 and the gas jetting chamber 43. The thrust control valve 41 also includes a plug 53 axially movable in the directions of the arrows C1 and C2 along the axis 44 in the gas supply chamber 42, the connecting passage 45 and the gas jetting chamber 43.

The plug 53 moves in the direction of either the arrow C1 or the arrow C2 to change simultaneously the respective sectional areas A1 and A2 of an upstream passage 49 on the side of the gas supply chamber 42 and a downstream passage 52 on the side of the gas jetting chamber 41. The upstream sectional area A1 is defined by an upstream inner surface 47 of the nozzle 46 defining the gas supply chamber 42 and an upstream outer surface 48 of the plug 53 facing the upstream inner surface 47 of the nozzle 46. The downstream sectional area A2 is defined by a downstream inner surface 50 of the nozzle 46 defining the gas jetting chamber 43 and a downstream outer surface 51 of the plug 53 facing the downstream inner surface 50. The thrust produced by jetting propulsion gas is controlled by the axial movement of the plug 53.

The plug 53 is moved along the axis 44 by an actuator, not shown. The axial position of the plug 53 is changed linearly in response to a linear control signal. The actuator may includes, for example, a servomotor, and a motion converting mechanism capable of converting the rotation of the output shaft of the servomotor into a longitudinal motion and of transmitting the longitudinal motion to the plug 53. A small, lightweight actuator can be used for operating the plug 53 when load on the plug 53 is small. Thus, the mass of the flying object can be reduced by using a thruster provided with this thrust control valve 41, which is effective in improving the maneuverability of the flying object.

The plug 53 is formed of a material having high heat resistance and high abrasion resistance, and including one or some of heat-resistant materials having tungsten, molybdenum, a carbon composite, a carbon-silica composite and graphite.

The respective sectional areas A1 and A2 of the upstream passage 49 on the side of the gas supply chamber 42 and the downstream passage 52 on the side of the gas jetting chamber 43 are changed by moving the plug 53 in either the direction of the arrow C1 or the direction of the arrow C2. The propulsion gas flows from the gas supply chamber 42 through the upstream passage 49, the connecting passage 45 and the downstream passage 52 at a flow rate dependent on the sectional areas A1 and A2 to control the thrust.

The plug 53 has an upstream pressure-receiving part 65 movable in the gas supply chamber 42 and the connecting passage 45 and having a pressure-receiving surface 64 on which the pressure of the propulsion gas acts to produce a force F1 that pushes the plug 53 in the direction of the arrow C2. The plug 53 also has a downstream pressure-receiving part 63 movable in the gas jetting chamber 43 and the connecting passage 45. The downstream pressure-receiving part 63 has a first inclined pressure-receiving surface 61 and a second inclined pressure-receiving surface 62 on which the pressure of the propulsion gas acts to produce a force F2 that pushes the plug 53 in the direction of the arrow C1.

The upstream pressure-receiving part 65 and the downstream pressure-receiving part 63 are connected via a straight connecting part 66 having a cylindrical shape.

The first inclined pressure-receiving surface 61 expands toward or approaches the inner surface 50 of the gas jetting chamber 43 along the direction of the arrow C1, and the second inclined pressure-receiving surface 62 extends so as to separate gradually from the inner surface 50 of the gas jetting chamber 43 along the direction of the arrow C1.

In a longitudinal section including the axis 44, each of the inclined pressure-receiving surfaces 61 and 62 may be a straight line, a stepped line or a smoothly curved line.

Figure 3:
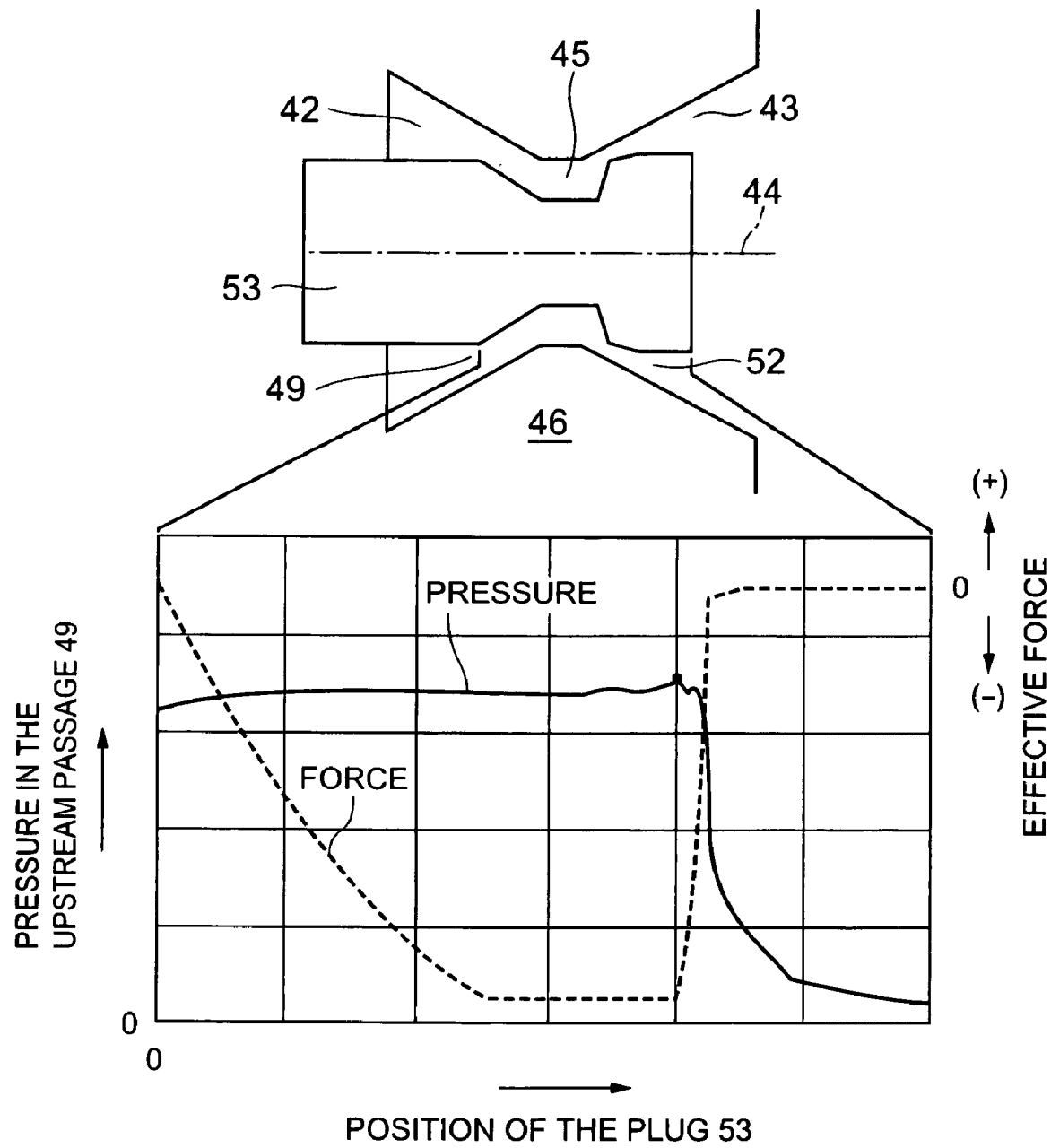
FIG. 3 is a graph, shown in combination with the thrust control valve shown in FIG. 1, showing the relation between pressures at positions in a gas supply chamber and a gas jetting chamber and total load on a plug included in the thrust control valve shown in FIG. 1.

FIG. 3 is a graph showing the relationship between pressure at positions in the upstream passage and the side of gas jetting chamber of the thrust control valve and total force acting on the plug 53. The pressure of the propulsion gas in the gas supply chamber 42 applied to the pressure-receiving surface 64 of the upstream pressure-receiving part 65 of the plug 53 produces a force F1 that tends to move the plug 53 axially in the direction of the arrow C2 (FIG. 1). The pressure of the propulsion gas in the gas jetting chamber 43 applied to the inclined pressure-receiving surfaces 61 and 62 of the downstream pressure-receiving part 63 of the plug 53 produces a force F0 that tends to move the plug axially in the direction of the arrow C1 (FIG. 1).

In FIG. 3, an effective force is the integral of the product of pressure and pressure-receiving area as a function of axial distance. In FIG. 3, a value of the force at the right-hand end is an effective force that acts on the plug 53.

Figure 4B:
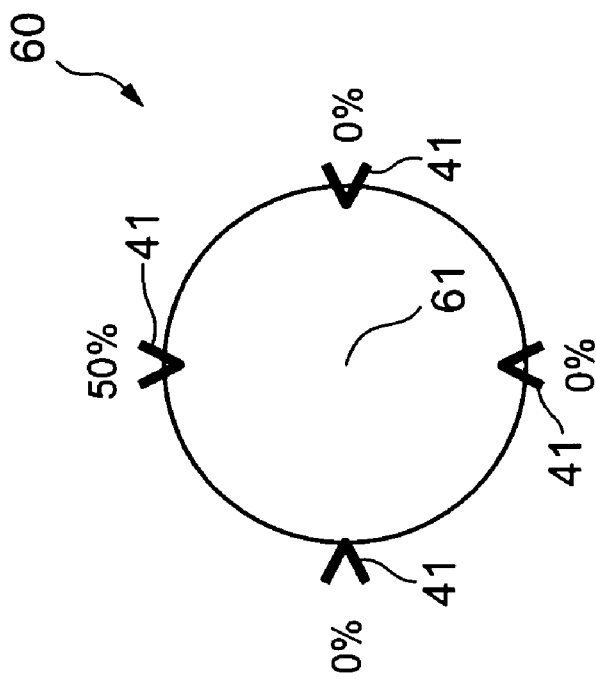
FIG. 4B is a diagram of assistance in explaining the propulsion gas flow rate suppressing effect of the thrust control valve shown in FIG. 1, showing a various jetting mode when four thrust control valves shown in FIG. 1 are incorporated into four thrusters mounted on a flying object at angular intervals of 90° about the axis of the flying object.
Figure 4A:
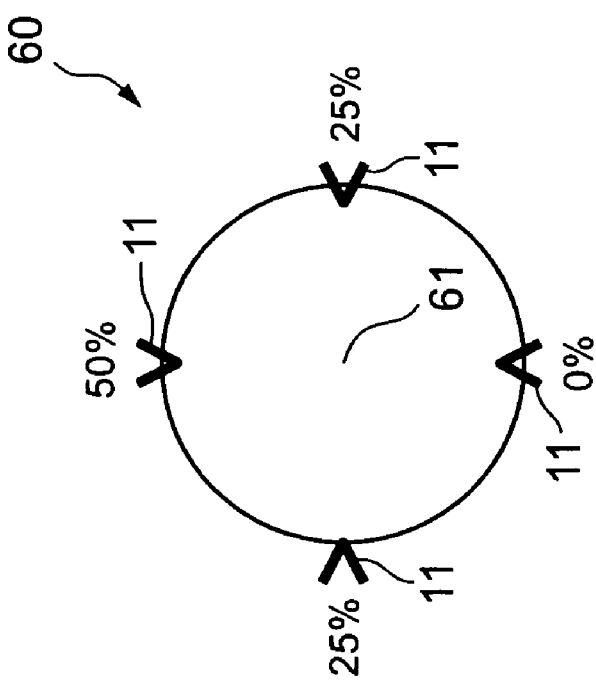
FIG. 4A is a diagram of assistance in comparatively explaining a various jetting mode when four differential thrust control valves similar to a conventional differential thrust control valve shown in FIG. 7 are incorporated into four thrusters mounted on a flying object at angular intervals of 90° about the axis of the flying object.
Figure 7:
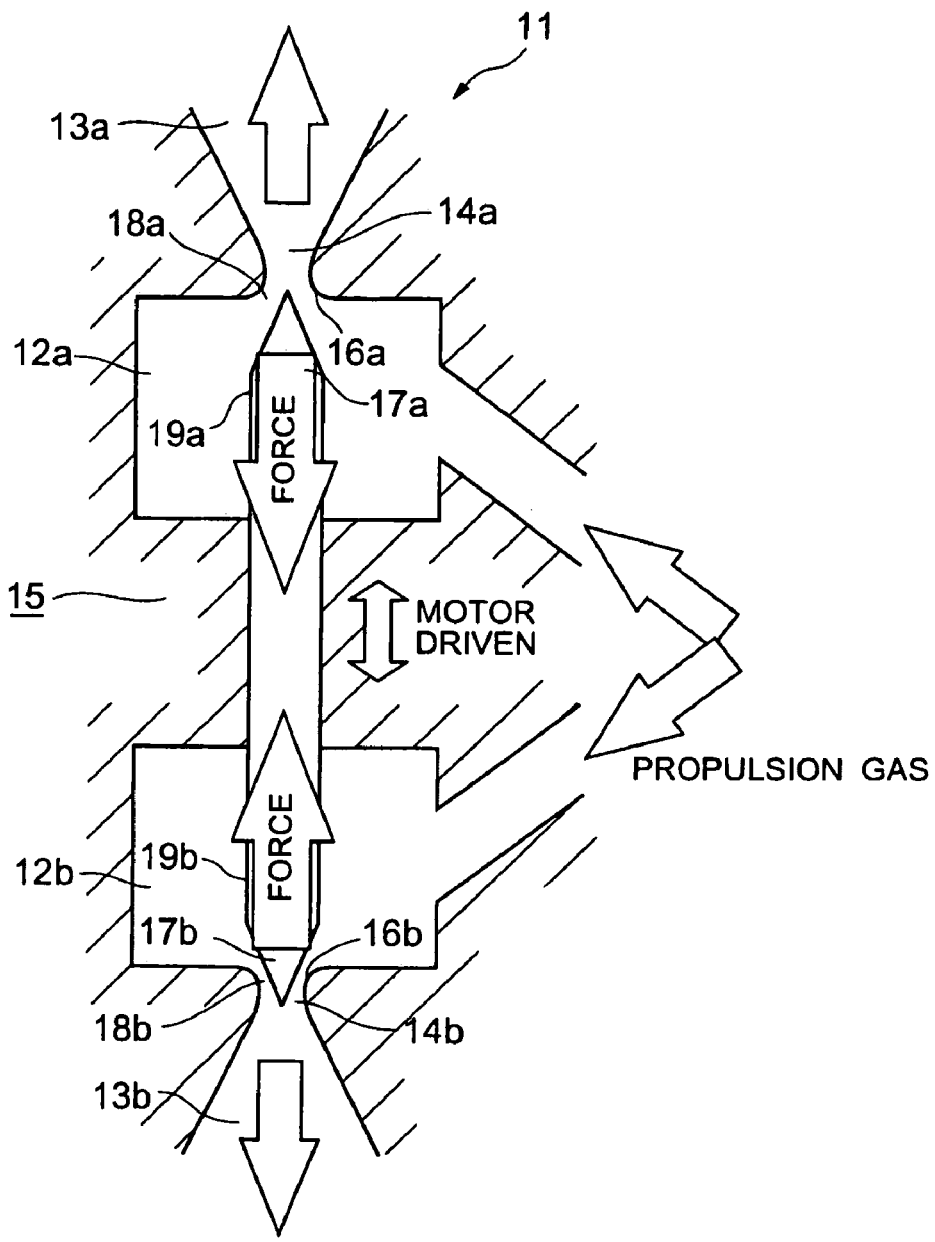
FIG. 7 is a schematic, fragmentary, longitudinal sectional view of a conventional differential thrust control valve.
Figures 8A, 8B:
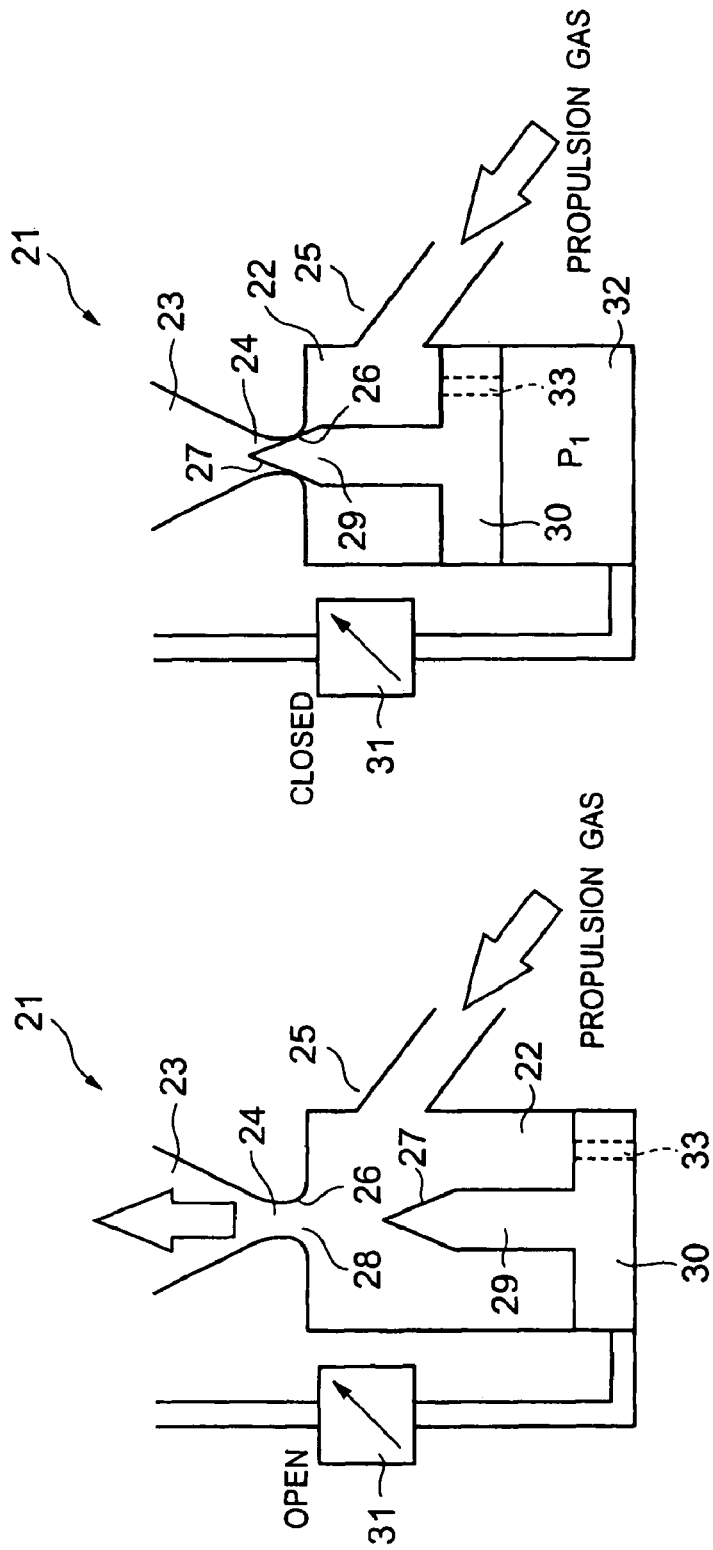
FIG. 8A is a schematic, fragmentary, longitudinal sectional view of a conventional floating-poppet thrust control valve in a fully open state.
FIG. 8B is a schematic, fragmentary, longitudinal sectional view of the floating-poppet thrust control valve shown in FIG. 8B in a fully closed state.

FIG. 4A is a diagram of assistance in comparatively explaining a various jetting mode when four differential thrust control valves 11 similar to the conventional differential thrust control valve 11 shown in FIG. 7 are incorporated into thrusters mounted on a flying object 60 at angular intervals of 90° about the axis 61 of the flying object 60, and FIG. 4B is a diagram of assistance in explaining the propulsion gas flow rate suppressing effect of the thrust control valve 41 shown in FIG. 1, showing a various jetting mode when four thrust control valves 41 shown in FIG. 1 are incorporated into four thrusters mounted on a flying object 60 at angular intervals of 90° about the axis 61 of the flying object 60. When the thrusters provided with the conventional differential thrust control valves 11 are mounted on the flying object 60 at angular intervals of 90° as shown in FIG. 4A, the load is controlled through the control of the pair of connected plugs of each differential thrust control valve 11. Twenty-five percent of the gas generating capacity (100%) of a gas generator that generates the propulsion gas needs to be allotted to each of the right and the left thrusters provided with the control valves 11 and not required to produce any thrust. Consequently, only 50% of the gas generating capacity of the gas generator allotted to the upper thruster provided with the thrust control valve 11. When the thrust control valves 41 of the present embodiment are incorporated into the thrusters mounted on the flying object 60 as shown in FIG. 4B, the propulsion gas can be jetted only through the thrust control valve 41 included in the thruster that is required to produce a thrust, and the thrust control valves 41 included in the thrusters not required to produce any thrust can be kept fully closed. Thus, the unnecessary use of the propulsion gas is reduced to the least possible extent, the propulsion gas is jetted only in necessary directions and the same thrust as that of the conventional thrust control valve can be produced.

Figure 5B:
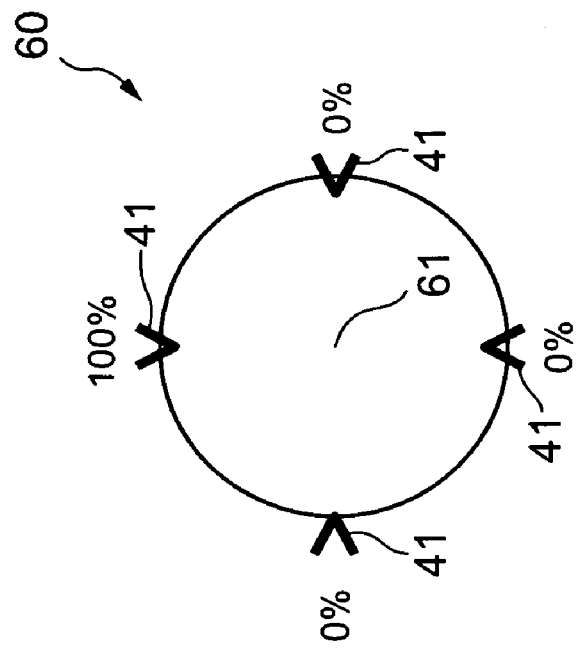
FIG. 5B is a diagram of assistance in explaining the maximum propulsion gas flow rate increasing effect of the thrust control valve shown in FIG. 1, showing a various jetting mode when four thrust control valves shown in FIG. 1 are incorporated into four thrusters mounted on a flying object at angular intervals of 90° about the axis of the flying object.
Figure 5A:
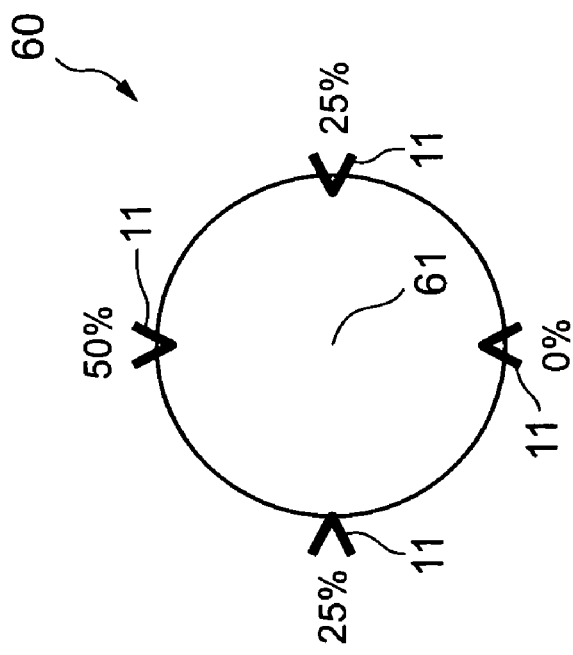
FIG. 5A is a diagram of assistance in comparatively explaining a various jetting mode when four differential thrust control valves similar to a conventional differential thrust control valve shown in FIG. 7 are incorporated into four thrusters mounted on a flying object at angular intervals of 90° about the axis of the flying object.
Figure 6B:
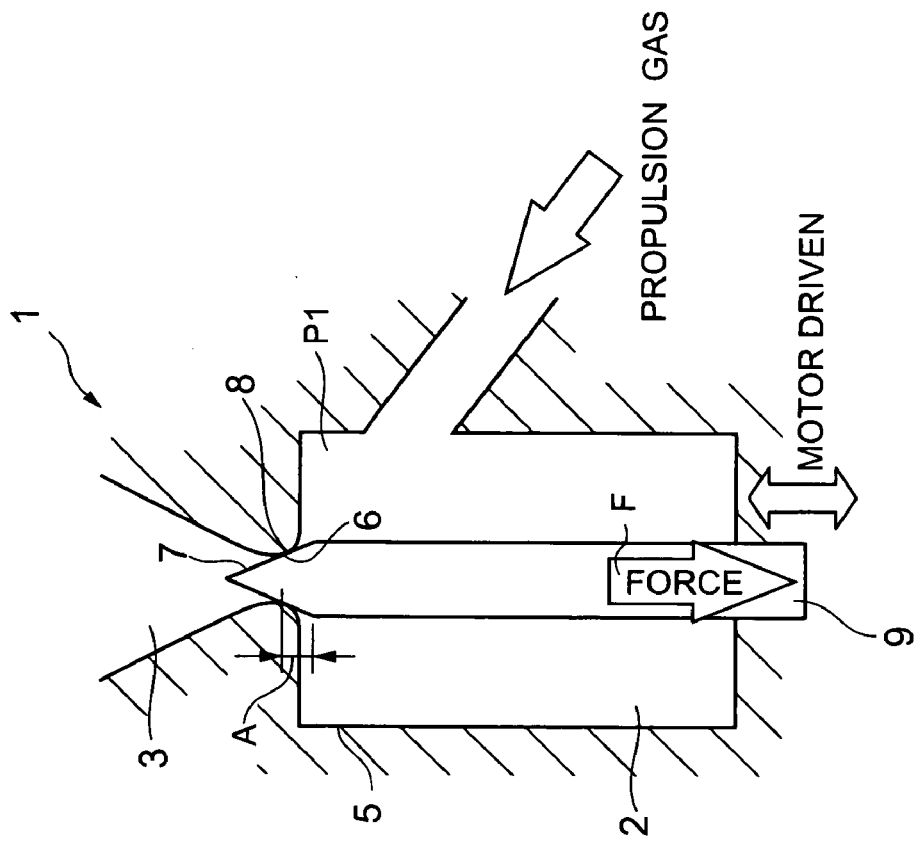
FIG. 6B is a schematic, fragmentary, longitudinal sectional view of the pintle thrust control valve shown in FIG. 6A in a fully closed state.
Figure 6A:
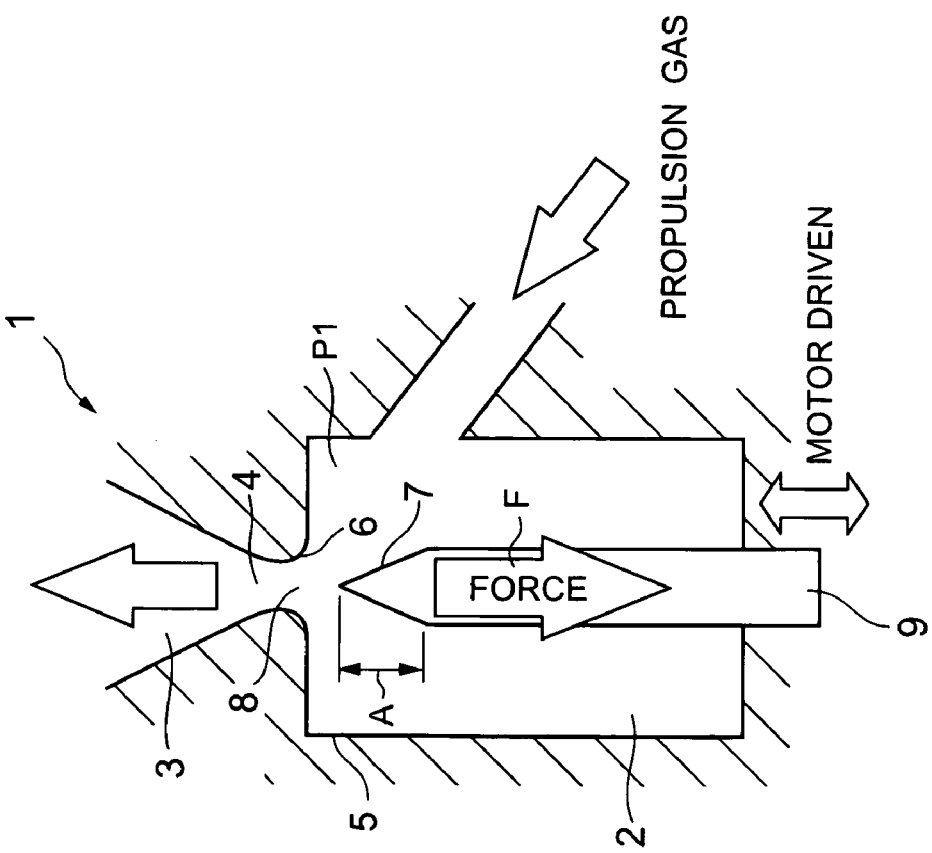
FIG. 6A is a schematic, fragmentary, longitudinal sectional view of a conventional pintle thrust control valve in a fully open state.

FIG. 5A is a diagram of assistance in comparatively explaining a various jetting mode when four differential thrust control valves 11 similar to the conventional differential thrust control valve 11 shown in FIG. 7 are incorporated into four thrusters mounted on a flying object 60 at angular intervals of 90° about the axis of the flying object 60. FIG. 5B is a diagram of assistance in explaining the maximum propulsion gas flow rate increasing effect of the thrust control valve 41 shown in FIG. 1, showing a various jetting mode when four thrust control valves 41 shown in FIG. 1 are incorporated into four thrusters mounted on a flying object 60 at angular intervals of 90° about the axis of the flying object 60. When the thrusters provided with the differential thrust control valves 11 are mounted on the flying object 60 at angular intervals of 90° as shown in FIG. 5A, the upper limit of a gas generating capacity that is allotted to each of the thrust control valves 11 is 50% of the gas generating capacity (100%) of a gas generator that generates the propulsion gas. When the thrust control valves 41 of the present embodiment are incorporated into the thrusters mounted on the flying object 60 as shown in FIG. 5B, 100% of the gas generating capacity of the gas generator is allotted to each of the thrust control valves 41. Consequently, the maximum thrust that can be produced by the thrust control valve 41 of the present embodiment is twice that can be produced by the conventional differential thrust control valve 11. Thus, the ability of the flying object to control attitude and orbit can be improved.

Since the downstream pressure-receiving part 63 of the plug 53 included in the thrust control valve 41 of the present embodiment has the first inclined pressure-receiving surface 61 and the second inclined pressure-receiving surface 62, the force that acts on the plug can easily and highly accurately be adjusted by individually adjusting the respective axial lengths, radial lengths and shapes of the inclined pressure-receiving surfaces 61 and 62. Consequently, the thrust control response characteristic of the thrust control valve 41 can easily and highly accurately be optimized according to a desired thrust.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A thrust control valve comprising:
   a nozzle provided with a gas supply chamber in which a propulsion gas is supplied, a gas jetting chamber through which the propulsion gas is jetted, and a connecting passage coaxially connecting the gas supply chamber and the gas jetting chamber, the nozzle having an upstream inner surface defining the gas supply chamber and a downstream inner surface defining the gas jetting chamber; and
   a plug inserted into the gas supply chamber, the connecting passage and the gas jetting chamber so as to be axially movable, the plug having an upstream outer surface facing the upstream inner surface to define an upstream passage on a side of the gas supply chamber together with the upstream inner surface, and a downstream outer surface facing the downstream inner surface to define a downstream passage on a side of the gas jetting chamber together with the downstream inner surface, the plug being configured to control a thrust to be produced by jetting the propulsion gas by simultaneously changing sectional areas of the upstream passage and the downstream passage by an axial movement of the plug, wherein:
   the plug has an upstream pressure-receiving part on the side of the gas supply chamber and a downstream pressure-receiving part on the side of the gas jetting chamber, the upstream pressure-receiving part being configured to move in the gas supply chamber and the connecting passage and having an upstream pressure-receiving surface on which a pressure of the propulsion gas acts to produce a force that acts in a direction from the side of the gas jetting chamber toward the side of the gas supply chamber, and the downstream pressure-receiving part being configured to move in the gas jetting chamber and the connecting passage and having a downstream pressure-receiving surface on which a pressure of the propulsion gas acts to produce a force that acts in a direction from the side of the gas supply chamber toward the side of the gas jetting chamber; and
   the downstream pressure-receiving surface has a first inclined surface which is inclined so as to approach the downstream inner surface along an axial direction away from the upstream pressure-receiving part and a second inclined surface which is inclined so as to separate from the downstream inner surface along the axial direction away from the upstream pressure-receiving part.

2. The thrust control valve according to claim 1, wherein the upstream pressure-receiving surface of the plug is inclined so as to separate from an axis of the plug along an axial direction away from the side of the gas jetting chamber.

3. The thrust control valve according to claim 1, wherein the upstream pressure-receiving part of the plug and the downstream pressure-receiving part of the plug are connected via a straight connecting part.

4. A thrust control valve comprising:
   a nozzle provided with a gas supply converging chamber in which a propulsion gas is supplied, a gas jetting diverging chamber through which the propulsion gas is jetted, and a throat connecting passage coaxially connecting the gas supply chamber and the gas jetting chamber, the nozzle having an upstream inner converging surface defining the gas supply chamber and a downstream inner diverging surface defining the gas jetting chamber; and
   a plug inserted into the gas supply chamber, the throat connecting passage and the gas jetting chamber so as to be axially movable, the plug having an upstream outer surface facing the upstream inner converging surface to define an upstream passage on a side of the gas supply chamber together with the upstream inner converging surface, and a downstream outer surface facing the downstream inner diverging surface to define a downstream passage on a side of the gas jetting chamber together with the downstream inner diverging surface, the plug being configured to control a thrust produced by jetting the propulsion gas by simultaneously changing sectional areas of the upstream passage and the downstream passage by an axial movement of the plug, wherein:

the plug has an upstream pressure-receiving part on the side of the gas supply chamber and a downstream pressure-receiving part on the side of the gas jetting chamber, the upstream pressure-receiving part being configured to move in the gas supply chamber and the throat connecting passage and having an upstream pressure-receiving surface on which a pressure of the propulsion gas acts to produce a force that acts in a direction from the side of the gas jetting chamber toward the side of the gas supply chamber, and the downstream pressure-receiving part being configured to move in the gas jetting chamber and the throat connecting passage and having a downstream pressure-receiving surface on which a pressure of the propulsion gas acts to produce a force that acts in a direction from the side of the gas supply chamber toward the side of the gas jetting chamber.

* * * * *